United States Patent
El-Hibri (10) Patent No.: US 7,456,248 B2
(45) Date of Patent: *Nov. 25, 2008

(54) POLYARYLETHERSULFONE COMPOSITIONS EXHIBITING REDUCED YELLOWNESS AND HIGH LIGHT TRANSMITTANCE PROPERTIES AND ARTICLES MADE THEREFROM

(75) Inventor: Mohammad Jamal El-Hibri, Atlanta, GA (US)

(73) Assignee: Solvay Advanced Polymers, L.L.C., Alpharetta, GA (US)

(*) Notice: Subject to any disclaimer, the term of this patent is extended or adjusted under 35 U.S.C. 154(b) by 335 days.

This patent is subject to a terminal disclaimer.

(21) Appl. No.: 10/510,707

(22) PCT Filed: Apr. 15, 2003

(86) PCT No.: PCT/US03/11502

§ 371 (c)(1),
(2), (4) Date: Jun. 30, 2005

(87) PCT Pub. No.: WO03/089520

PCT Pub. Date: Oct. 30, 2003

(65) Prior Publication Data

US 2006/0052494 A1  Mar. 9, 2006

Related U.S. Application Data

(60) Provisional application No. 60/372,079, filed on Apr. 15, 2002.

(51) Int. Cl.
*C08G 75/20* (2006.01)
*C08G 75/00* (2006.01)
*H01L 21/02* (2006.01)

(52) U.S. Cl. .............. 528/391; 528/171; 528/373; 438/31; 438/643

(58) Field of Classification Search ............. 528/171, 528/373, 391; 438/643, 31
See application file for complete search history.

(56) References Cited

U.S. PATENT DOCUMENTS

| | | | | |
|---|---|---|---|---|
| 3,755,256 | A | * | 8/1973 | Beverly .................. 524/141 |
| 4,108,837 | A | | 8/1978 | Johnson et al. |
| 4,175,175 | A | | 11/1979 | Johnson et al. |
| 4,409,351 | A | | 10/1983 | Lee |
| 5,438,086 | A | * | 8/1995 | Stevenson et al. .......... 524/120 |
| 6,355,723 | B1 | | 3/2002 | Van Baal et al. |
| 2001/0053805 | A1 | * | 12/2001 | Srchibald et al. .......... 524/120 |
| 2002/0010307 | A1 | | 1/2002 | Schwab |
| 2005/0003661 | A1 | | 1/2005 | El-Hibri |

FOREIGN PATENT DOCUMENTS

GB 1 398 133 6/1975

OTHER PUBLICATIONS

Claims of U.S. Appl. No. 10/511,094.*

* cited by examiner

*Primary Examiner*—Duc Truong
(74) *Attorney, Agent, or Firm*—Oblon, Spivak, McClelland, Maier & Neustadt, P.C.

(57) ABSTRACT

A polyarylethersulfone polymer composition comprising a polyarylethersulfone having reduced yellowness and high light transmittance is provided. The composition includes an organic phosphorous-containing compound and at least one of the following two additives: a colorant, and an optical brightener. The polyarylethersulfone composition of the present invention is used to form molded articles suitable for food and beverage service, medical components, and lighting components.

23 Claims, 1 Drawing Sheet

POLYARYLETHERSULFONE COMPOSITIONS EXHIBITING REDUCED YELLOWNESS AND HIGH LIGHT TRANSMITTANCE PROPERTIES AND ARTICLES MADE THEREFROM

CROSS REFERENCE TO PROVISIONAL APPLICATIONS

This application claims priority from U.S. provisional patent application Ser. No. 60/372,079; filed Apr. 15, 2002, the entire disclosure of which is incorporated herein by reference.

TECHNICAL FIELD

This invention is directed to polyarylethersulfone compositions with low yellowness index and high light transmittance, and articles made from the polyarylethersulfone compositions, such as steam sterilizable medical components, food and beverage containers, including hot beverage storage containers and baby bottles, and lighting components.

BACKGROUND OF THE INVENTION

Polyarylethersulfones (PAES) are a commercially important family of high performance, high temperature amorphous thermoplastics. These polymers are of interest to many industries because of their combination of high heat resistance, hydrolysis resistance in steam and hot water environments and good overall chemical resistance. Another reason these polymers are of great commercial utility, is because in addition to offering the stated high performance attributes, they are also transparent, unlike most semi-crystalline materials which are also used in high temperature applications.

Polyarylethersulfones, which include polyethersulfone or polyphenylsulfone can be produced by a variety of methods. For example U.S. Pat. Nos. 4,108,837 and 4,175,175 describe the preparation of polyarylethers and in particular polyarylethersulfones. Several one-step and two-step processes are described in these patents, which patents are incorporated herein by reference in their entireties. In these processes, a double alkali metal salt of a dihydric phenol is reacted with a dihalobenzenoid compound in the presence of sulfone or sulfoxide solvents under substantially anhydrous conditions. In a two-step process, a dihydric phenol is first converted, in situ, in the presence of a sulfone or sulfoxide solvent to the alkali metal salt derivative by reaction with an alkali metal or an alkali metal compound.

The transparency of polyarylethersulfones allows uses such as lids and covers for surgical and dental instrument sterilization trays which have to undergo steam autoclave sterilization. Other uses include medical research lab animal cages, dairy processing equipment, particularly milking machine components. Food and beverage uses also include uses such as coffee serving carafes and containers, microwave cookware, covers for cookware containers and doors and windows for appliances, such as rotisserie grills. The inherent flammability resistance and low smoke release characteristics of polyarylethersulfones, particularly those of polyphenylsulfone, make this polymer of great interest and utility to the mass transit industry where low heat release on combustion and low toxic smoke emission properties of components used in passenger compartments are of utmost importance. The aircraft industry in particular has capitalized on the low flammability and low smoke attributes of polyphenylsulfone for many years using this resin in a variety of cabin interior components.

While the polyarylethersulfones are transparent polymers, they do exhibit a yellow or amber cast. This yellow/amber cast is undesirable in a number of the uses described above. In most cases it is tolerated because of the lack of any viable material alternatives. In some other cases, such as in consumer oriented applications, where aesthetics are more important, the yellow or amber cast is unacceptable. Consumer oriented hot food or hot beverage service items like tableware and baby bottles are examples of such color and appearance sensitive applications. The key features of polyarylethersulfones in these applications are: good physical/mechanical integrity at high temperatures, hot water resistance as well as resistance to cleaning agents, and food contact safety by virtue of the chemical inertness of the resin under conditions of use.

Commercially important polyarylethersulfones include polyethersulfone (PES) and polyphenylsulfone (PPSI). PES and PPSU have very high glass transition temperatures (~220° C.) and comprise the following repeating unit structures:

Polyethersulfone

Polyphenylsulfone

The average number of repeat units, n, per polymer chain of the above polymers is generally greater than 30 and more typically greater than about 40 to ensure sufficiently high molecular weight for robust physical and mechanical integrity of the polymers when fabricated into structural components.

As stated above, one of the limitations of PAES resins in consumer-related uses stems from the resins' yellow cast in their natural form. The yellowness in the natural resin can have varying degrees depending on a number of factors. However, in most cases it is aesthetically unacceptable. The present practice to neutralize or mask yellowness in polyarylethersulfones has so far been limited to the addition of a violet or deep blue dye. The dye is effective at masking yellowness, but it produces a "smoky" appearance with a substantial attendant reduction in visible light transmittance.

For a molded, transparent, food and beverage handling product to be aesthetically appealing, it is generally accepted that it must meet three optical property requirements:

1. A low yellowness index, as commonly measured by ASTM method D-1925, is needed. A yellowness index less than about 60, preferably less than about 40, and more preferably less than about 30 for a molded article is generally desirable at an article thickness of 0.1 inch. Yellowness index is a thickness dependent property.
2. A high light transmittance as commonly measured by ASTM method D-1003 is also a key requirement. Light transmittance values greater than about 50% at 0.1 inch thickness are desired. Light transmittance is also a thickness dependent property although generally to a lesser extent than yellowness index. It is commonly measured at a thickness of 0.1 inch (2.5 mm), so that if the transmittance requirements are met at 0.1 inch (2.5 mm) thickness, they will be automatically met at reduced thicknesses.

3. A low haze as measured by ASTM method D-1003 is also a requirement. Haze is the ratio of the diffuse light transmittance to the total light transmittance through a specimen and it generally needs to be below about 10 and preferably below 6 for 0.1 inch (2.5 mm) thick test specimen. Like yellowness index and light transmittance, haze is also dependent on specimen thickness, so it is important to compare haze between different materials only at comparable thicknesses and specimen surface characteristics.

Historically, Union Carbide, Amoco, and then Solvay Advanced Polymers, LLC have measured and tracked the color of polyarylethersulfone polymers using the internal parameter of color factor (CF). The plastics industry as a whole, on the other hand, uses yellowness index (YI) to quantify color of film and moldings. It is instructive to look first at these two quantities and how they relate to each other.

Yellowness index and color factor are two different quantities from the standpoint of the definition of the parameter. However, for practical purposes, they do correlate very well.

By definition, yellowness index (YI) is calculated from the equation below based on ASTM method D-1925:

$$YI=[100(1.28X-1.06Z)]/Y$$

where in the equation above, X Y and Z are the tristimulus transmittance values for red, green and blue light, respectively, in the CIE system.

Color Factor (CF) is defined as the following quantity:

$$CF=270[(x+y)_{sample}-(x+y)_{air}]/t$$

where x and y are the chromaticity coordinates obtained by normalizing the X and Y tristimulus transmittance values. The chromaticity coordinates x and y are calculated by the following equations:

$$x=X/(X+Y+Z)$$

$$y=Y/(X+Y+Z)$$

The X, Y and Z are the tristimulus transmittance components corresponding to red, green and blue light respectively based on illuminating the sample with a standard light source, such as illuminant C or illuminant D65 according to ASTM method D-1003. The variable t is the sample thickness in inches. So, unlike YI, CF is independent of thickness at least up to a molded component thickness of about 1 inch, which is one attractive aspect of the quantity. The 270 factor is an arbitrarily chosen factor intended primarily to bring the CF values into a convenient range to work with. Based on studies conducted at Solvay Advanced Polymers, YI and CF of polyarylethersulfones are very well correlated (with a correlation coefficient >0.99) by the following equation for measurements on 0.1 inch thick specimens:

$$YI=0.19(CF)$$

so that a color-factor of 100, for example, indicates a yellowness index of approximately 19 on the same specimen.

As mentioned above, yellowness index, light transmittance and haze are all thickness dependent properties so that thickness needs to be reported along with these measurements. Preferably multiple thicknesses should be measured to show the dependence of these properties on thickness over a practical range of thicknesses.

It is desirable to produce a PAES with a reduced CF and haze and increased transmittance for molded consumer articles. To achieve low color factors, technology improvements are necessary in either or both the synthesis-process side and in the stabilization of the pellets supplied to the customers for prevention of additional color generation during melt fabrication into injection molded articles.

SUMMARY OF THE INVENTION

There exists a need in the polymer composition art for a high temperature, high strength, chemically resistant, clarified polymer composition that has a combination of high transmittance, low yellowness index, and low haze. There exists a need in the thermoplastic molding art for a high strength, high glass transition temperature polymer compositions with a low yellowness index.

These and other needs are met by certain embodiments of the present invention, which provide a polyarylethersulfone polymer composition comprising a polyethersulfone or polyphenylsulfone. The composition also includes an organic phosphorous-containing compound and at least one of the following additives: a colorant and an optical brightener.

The earlier stated needs are also met by certain embodiments of the present invention which provide a polyarylethersulfone composition comprising a polyethersulfone or polyphenylsulfone; from about 30 to about 3000 ppm of an organic phosphorous-containing melt stabilizer; and at least one of the following additives: from about 0.1 ppm to about 200 ppm of a blue to violet dye; and from about 1 ppm to about 10,000 ppm of an optical brightener.

The earlier stated needs are also met by certain embodiments of the present invention comprising a polyarylethersulfone polymer composition comprising a polyethersulfone or polyphenylsulfone. The composition further comprises an organic phosphorous-containing compound, a colorant, and an optical brightener.

The earlier stated needs are further met by certain embodiments of the present invention consisting of a polyethersulfone or a polyphenylsulfone and an organic phosphorous-containing compound and at least one of a colorant and an optical brightener.

The earlier stated needs are further met by certain embodiments of the present invention consisting of a polyethersulfone or a polyphenylsulfone, at least one organic phosphorous-containing compound, a colorant, and an optical brightener.

The earlier stated needs are further met by certain embodiments of the present invention consisting of a polyethersulfone or a polyphenylsulfone, an organic phosphite and/or organic phosphonite, a blue to violet dye, and an organic optical brightener.

The earlier stated needs are further met by certain embodiments of the present invention that include melt fabricated, injection molded, compression molded, extruded, blow-molded, hybrid injection-compression molded, or thermoformed articles made from a polyarylethersulfone polymer composition comprising a polyethersulfone or a polyphenylsulfone. The composition includes an organic phosphorous-containing compound and at least one of the following additives: a colorant, and an optical brightener.

Suitable melt stabilization schemes have been identified that inhibit thermally induced color development during processing operations. In certain embodiments of the present invention a melt stabilization additive is combined with trace amounts of a to blue to violet dye and/or an optical brightener to offset all or part of the remaining yellowness in the resin.

Reduced color factors, increased transmittance, and good overall aesthetics have been achieved on molded plaques based on embodiments of this invention.

The instant invention addresses the longstanding limitation of yellowing in polyarylethersulfones thereby allowing modified compositions that reach the clarity levels needed for aesthetically challenging applications to be possible for the first time. The present invention overcomes the long-standing limitations in polyarylethersulfones by enabling, for the first time, the production of low yellowness and low haze polyarylethersulfone with high light transmittance characteristics over the visible spectrum.

DETAILED DESCRIPTION OF THE INVENTION

The present invention enables the production of molded polyarylethersulfone articles with improved light transmittance and reduced yellowness. The present invention provides lightweight, high-light transmittance, low yellowness food and beverage storage containers, medical components and components useful in mass transit interiors. The present invention allows the production of light-weight, tough, aesthetically appealing food and beverage serving containers, such as microwave cookware and baby bottles, steam sterilizable and chemically resistant medical components such intravenous nutrient delivery and drug delivery components and lids for steam sterilizable surgical instrument containers. The present invention also allows for the production of rigid and flexible packaging based on polyarylethersulfones. The present invention further allows for the production of glazing. In addition, the present invention allows for the production of components used in lighting such as diffusers and decorative covers, particularly those for use in mass transit interiors such as on buses, trains or commercial aircraft where the need for flammability resistance is critical. The present invention further allows high temperature handling and molding of polyarylethersulfone without the attendant decrease in light transmittance and increased yellowing observed in prior art polyarylethersulfone compositions. These benefits are provided by a polyarylethersulfone composition comprising small amounts of additives selected from organic phosphorous-containing compounds, optical brighteners, and blue to violet dyes.

This invention removes the yellow cast from polyethersulfone and polyphenylsulfone compositions. The removal of the yellow cast is desirable, or required for some consumer items like baby bottles where aesthetics are important and where the consumer has become accustomed to the "crystal clear" appearance of polycarbonate. The violet dye, ZIRS Oil Violet™, has been used to mask the yellowness in polyarylethersulfone resins. While this dye is effective at removing yellowness, it also significantly reduces light transmittance properties of the resin due to its strong absorption in the blue-green region of the spectrum. Alternatives to the ZIRS Oil Violet™ dye that will neutralize the yellow cast of the polyarylethersulfone compositions without adversely affecting light transmittance properties are desirable.

This invention will be described in conjunction with specific examples of polyarylethersulfone compositions. However, these are exemplary only, as the claimed invention is not limited to the specific examples described herein.

Certain embodiments of the invention disclosed herein rely on using a mixture of additives comprised of: (1) an organic phosphorous-containing compound added for the purpose of limiting further yellowness development in the composition as a result of melt processing of the composition during the blending process or during the subsequent fabrication process used by the fabricator or end user; (2) an optical brightener added for the purpose of enhancing light transmittance over the visible spectrum; (3) one or more dyes in the blue to violet color range. The above-described additive system can be incorporated by methods known in the art. Examples include melt blending by compounding and dry blending of virgin resin pellets with concentrate pellets (also known as a master batch) containing a high loading of the additives.

In the concentrate or master batch approach, a blend of the desired additives is melt compounded into the base PAES polymer at loadings substantially higher (e.g. 5 to 10 times) than the target levels of these additives to produce homogeneous pellets with a concentrated presence of the additives. The pellets of the master batch are then tumble blended with virgin PAES pellets and injection molded or extruded or otherwise melt fabricated into their final form. This approach affords the benefit of eliminating yellowness increases that can be caused by melt compounding the entire formulation, as only the concentrate/master batch (e.g. 10% of the resin) needs melt compounding in this case.

This invention relates to polyarylethersulfone compositions that are modified for reduced yellowness and increased light transmittance in the visible spectrum to allow production of more aesthetically pleasing molded articles with improved clarity characteristics. Through the use of certain embodiments of this invention, one can produce polyarylethersulfone molded articles exhibiting light transmittance values per ASTM D-1003 of >60% and yellowness indices <30 as measured per ASTM D-1925, both tests being conducted on 0.1 inch (2.5 mm thick specimens).

This invention relates to polyarylethersulfone compositions that are low in color and yellowness and high in light transmittance over the visible spectrum. Compositions according to certain embodiments of this invention comprise polyarylethersulfone to which is added from about 30 ppm to about 3000 ppm of an organic phosphorous-containing melt stabilizer and at least one of the following additives:
 1. from about 1 ppm to 10,000 ppm of an optical brightener, and
 2. from about 0.1 to about 200 ppm of one or more blue to violet dyes. The amount of the additives is based on the weight of the polyarylethersulfone.

Certain other embodiments of the present invention comprise a polyethersulfone or polyphenylsulfone and from about 100 ppm to about 1500 ppm of an organic phosphorous-containing melt stabilizer and at least one of the following additives:
 1. from about 10 ppm to about 1000 ppm of an optical brightener, and
 2. from about 1 ppm to about 20 ppm of one or more of blue to violet dyes, based on the weight of the polyarylethersulfone.

Certain other embodiments of this invention further comprise a polyarylethersulfone to which is added from about 30 to about 3000 ppm of an additive selected from the group consisting of organic phosphites and phosphonites and mixtures thereof, and from about 1 ppm to about 10,000 ppm of an optical brightener and/or from about 0.1 to about 200 ppm of one or more blue to violet dyes.

Other certain embodiments of the present invention comprise from about 100 to about 1500 ppm of an additive selected from the group consisting of organic phosphites and organic phosphonites and mixtures thereof, and from about 10 to about 1000 ppm of an optical brightener, and/or from about 1 to about 20 ppm of one or more blue to violet dyes.

Additional certain embodiments of the instant invention comprise from about 200 to about 800 ppm of an additive selected from the group consisting of organic phosphites and organic phosphonites and mixtures thereof, and from about 50 to about 500 ppm of an optical brightener, and/or from about 2 to about 15 ppm of one or more blue to violet dyes.

Certain embodiments of the present invention include polyethersulfone compositions that exhibit a light transmittance of at least about 60% and a haze of less than about 5% when measured on 0.1 inch thick specimens using ASTM method D-1003. Certain other polyethersulfone composition embodiments of the present invention further exhibit 1) a yellowness index (YI) of less than about 30 as measured according to ASTM D-1925 on 0.1 inch thick specimens, or 2) a color factor (CF) of less than about 150.

Certain embodiments of the present invention include polyphenylsulfone compositions that exhibit a light transmittance of at least about 50% and a haze of less than 5.5% when measured on 0.1 inch thick specimens using ASTM method D-1003. Certain other polyphenylsulfone composition embodiments of the present invention further exhibit 1) a yellowness index (YI) of less than 54 as measured according to ASTM D-1925 on 0.1 inch thick specimens, or 2) a color factor (CF) of less than 280.

The additive system included within the scope of this invention can be added either by direct compounding or during the part fabrication step through the use of a master batch containing a concentrated form of the additive system.

Suitable polyarylethersulfones included in the scope of this invention include polyethersulfone and polyphenylsulfone, and copolymers and miscible blends thereof. Polyethersulfone is available commercially from a number of sources. The basic polyethersulfone polymer backbone is based on the polycondensation reaction of 4,4'-dihalodiphenylsulfone, most typically 4,4'-dichlorodiphenylsulfone with 4,4'-dihydroxydiphenylsulfone (bisphenol S) in a molar ratio close to 1:1. Copolymers of polyethersulfone where a minor portion of the bisphenol S is substituted with one or more other aromatic dihydroxy monomer compounds are also within the scope of the definition of the polyethersulfone that can be used in the practice of this invention. The other aromatic dihydroxy monomers that can be used in conjunction with bisphenol S include but are not limited to: hydroquinone, 4,4'-dihydroxydiphenyl (biphenol), bisphenol A, and 4,4'-dihydroxydiphenylether. The minor aromatic dihydroxy monomer component, such as hydroquinone, can be used in molar ratios relative to the bisphenol S of up to about 30/70 while the ratio of the 4,4'-dihalodiphenylsulfone to the total combination of aromatic dihydroxy monomers used is maintained close to 1:1 on a molar basis. An exemplary source of a polyethersulfone containing a minor aromatic dihydroxy monomer component is RADEL® A, available from Solvay Advanced Polymers, LLC. RADEL® A polyethersulfone is the polycondensation product of 4,4'-dichlorodiphenylsulfone with 4,4'-dihydroxydiphenylsulfone and hydroquinone reacted in the molar ratios of about 1:0.75:0.25. Polyphenylsulfone is available as RADEL® R from Solvay Advanced Polymers, LLC. Polyphenylsulfone is based on the polycondensation reaction of 4,4'-dihalodiphenylsulfone with 4,4'-dihydroxydiphenyl. As mentioned with respect to the polyethersulfone, copolymers based on incorporation of a minor aromatic dihydroxy monomer component, up to about 30 mole % with the 4,4'-dihydroxydiphenyl would fall with the scope of the definition of polyphenylsulfone that can be used in this invention.

Any organic optical brightener that is soluble in polyarylethersulfones is suitable for use in the present invention. An optical brightener is a compound that absorbs light in the near UV region and re-emits or fluoresces the energy absorbed in the visible range. The specific organic phosphites and organic phosphonites described herein should not be construed as a limitation on the compounds that are within the realm of possible embodiments of the invention. There are no limitations on the blue to violet dyes that can be used, except for the practical limitations that such dyes must be soluble in the polyarylethersulfone and must possess sufficient thermal stability to allow incorporation into these high temperature polymers via melt compounding.

The present invention enables the production of molded polyarylethersulfone articles with improved light transmittance and reduced yellowing. The present invention allows the high temperature handling and molding of polyarylethersulfone without the attendant decrease in light transmittance and increased yellowing observed in prior art polyarylethersulfone compositions Organic phosphorous-containing melt stabilizers suitable for use in the practice of this invention can be from the phosphite or phosphonite family or mixtures thereof. Suitable phosphites include mono and dialkyl substituted aromatic phosphites. In certain embodiments of the present invention the phosphites are di-t-butyl substituted aromatic phosphites, such as tris(2,4-di-t-butyl-phenyl) phosphite. In other certain embodiments of the present invention suitable phosphites include those containing the pentaerythritol moiety. These include compounds such as: bis(2,4-di-t-butylphenyl)pentaerythritol diphosphite, distearyl pentaerythritol diphosphite, and bis(2,4-dicumylphenyl) pentaerythritol diphosphite. Aromatic phosphonites are also suitable in certain embodiments of this invention, particularly aromatic mono and diphosphonites. A particularly suitable phosphonite is tetrakis(2,4-di-tert-butylphenyl)[1,1-biphenyl]-4,4'-diylbisphosphonite. In certain embodiments of this invention this phosphonite is used in combination with a phosphite from the above described phosphites. In certain embodiments of this invention the phosphonite used in combination with the phosphonite is tris(2,4-t-butylphenyl)phosphite. In such mixtures the phosphonite is preferred to be the major component and the phosphite the minor one. A stabilizer composition which fits this description is sold commercially under the trademark Sandostab PEPQ™. Sandostab PEPQ™ has been found to be particularly well-suited for use in the practice of this invention.

Some suitable organic phosphorous-containing melt stabilizers are listed in Table 1. Additional suitable organic phosphorous-containing melt stabilizers include Weston 618™, Weston TLP™, and Ultranox 626™ available from General Electric Specialty Chemicals, Inc. Irgafos 168™ is a phosphite available from Ciba Specialty Chemicals, Inc. Other suitable organic phosphites include Doverphos S-9228™ which is bis(2,4-dicumylphenyl) pentaerythritol diphosphite available from Dover Chemical.

Suitable optical brighteners and a dye are listed in Table 2. Calco Oil Violet ZIRS™ is anthracenedione dye available from BASF. Eastobrite OB-1™ and OB-3™ are bisbenzoxazole based optical brighteners available from Eastman Chemical Co. The OB-3™ differs from the OB-1™ in that it includes a small amount of blue dye pre-blended into it by the supplier. The OB-1™ does not contain such a dye.

TABLE 1

Selected phosphorous-containing melt stabilizers suitable for use in the practice of this invention.

| Trade Name | Chemical Name | Supplier | Chemical Structure |
|---|---|---|---|
| Weston 618 ™ | Distearyl pentaerythritol diphosphite | GE Specialty Chemicals, Inc. | I |
| Sandostab PEPQ ™ | Mixture of three phosphonites and one phosphite | Clariant Corp. | II |
| Irgafos 168 ™ | Tris(2,4-di-t-butyl phenyl) phosphite | Ciba Specialty Chemicals, Inc. | III |
| Ultranox 626 ™ | Bis(2,4-di-t-butyl phenyl) pentaerythritol diphosphite | GE Specialty Chemicals, Inc. | IV |
| Weston TLP ™ | Trilauryl phosphite | GE Specialty Chemicals, Inc. | V |

TABLE 2

A dye and optical brighteners suitable for use in the practice of this invention.

| Trade Name | Chemical Name | Supplier | Chemical Structure |
|---|---|---|---|
| Calco Oil Violet ZIRS ™ | 1-hydroxy-4-{(4-methylphenyl)amino)-9,10-anthracenedione | BASF | VI |
| Eastobrite OB-1 ™ | 2,2'-(1,2-Ethenediyldi-4,1-phenylene)bisbenzoxazole | Eastman Chemical Co. | VII |
| Eastobrite OB-3 ™ | 2,2'-(1,2-Ethenediyldi-4,1-phenylene)bisbenzoxazole | Eastman Chemical Co. | VII |

The chemical structures of phosphites and phosphonites listed in Table 1.

[I]

[III]

[IV]

[V]

The composition and Stricture of PEPQ™:

[II]

-continued (c. 17%)

(c. 13%)

The chemical structures of the violet dye and optical brighteners listed in Table 2.

[VI]

[VII]

In addition to the additives required for the practice of this invention, other additives can be incorporated to achieve other targeted performance or processing attributes. These can include but are not limited to: lubricants, mold releases, antistatic agents, UV absorbers, flame retardants, anti-fogging agents and matting agents.

Approaches investigated to provide improved yellowness masking and removal include the use of optical brighteners, blue to violet dyes, the use of a melt stabilizer to limit color rise during processing, and combinations of these approaches. Polyethersulfone and polyphenylsulfone formulations prepared are listed in Tables 3 and 4. The additives are added in the amounts shown and the balance of the compositions is the polyarylethersulfone. These formulations were prepared by melt compounding on a 40 mm ZSK-40 Werner-Pfleiderer twin screw extruder using a 4×3 mm hole die, a screw rpm of about 250, a throughput rate of about 200 lb/hr and a melt temperature of 380-390° C. in order to simulate commercial scale production of these materials. Optical properties were measured according to the methods listed in Table 5 on 2"×3" injection molded color plaques that were 0.1 inch thick.

TABLE 3

Polyethersulfone compositions.

| Components | C1 | C2 | C3 | C4 | C5 | C6 | 1 |
|---|---|---|---|---|---|---|---|
| RADEL ® A-200 NT | 100% | 100% | balance | balance | balance | balance | balance |
| Calco Oil Violet ZIRS ™ | — | — | 10 ppm | — | — | 5 ppm | 5 ppm |
| EASTOBRITE OB-3 ™ | — | — | — | 100 ppm | 200 ppm | 200 ppm | 200 ppm |
| PEPQ ™ Stabilizer | — | — | — | — | — | — | 500 ppm |
| Comments | Virgin Control, Not Extruded | Extruded Control | — | — | — | — | — |

TABLE 4

Polyphenylsulfone compositions.

| Components | C7 | C8 | 2 | 3 | C9 |
|---|---|---|---|---|---|
| RADEL ® R-5000 NT | 100% | balance | balance | balance | 100% |
| ZIRS Oil of Violet ™ | — | 5 ppm | 5 ppm | 8 ppm | — |
| EASTOBRITE OB-3 ™ | — | 200 ppm | 200 ppm | 400 ppm | — |
| PEPQ ™ Stabilizer | — | — | 500 ppm | 500 ppm | — |
| Comments | Extruded Control | — | — | — | Virgin Control, Not Extruded |

Figure 1:
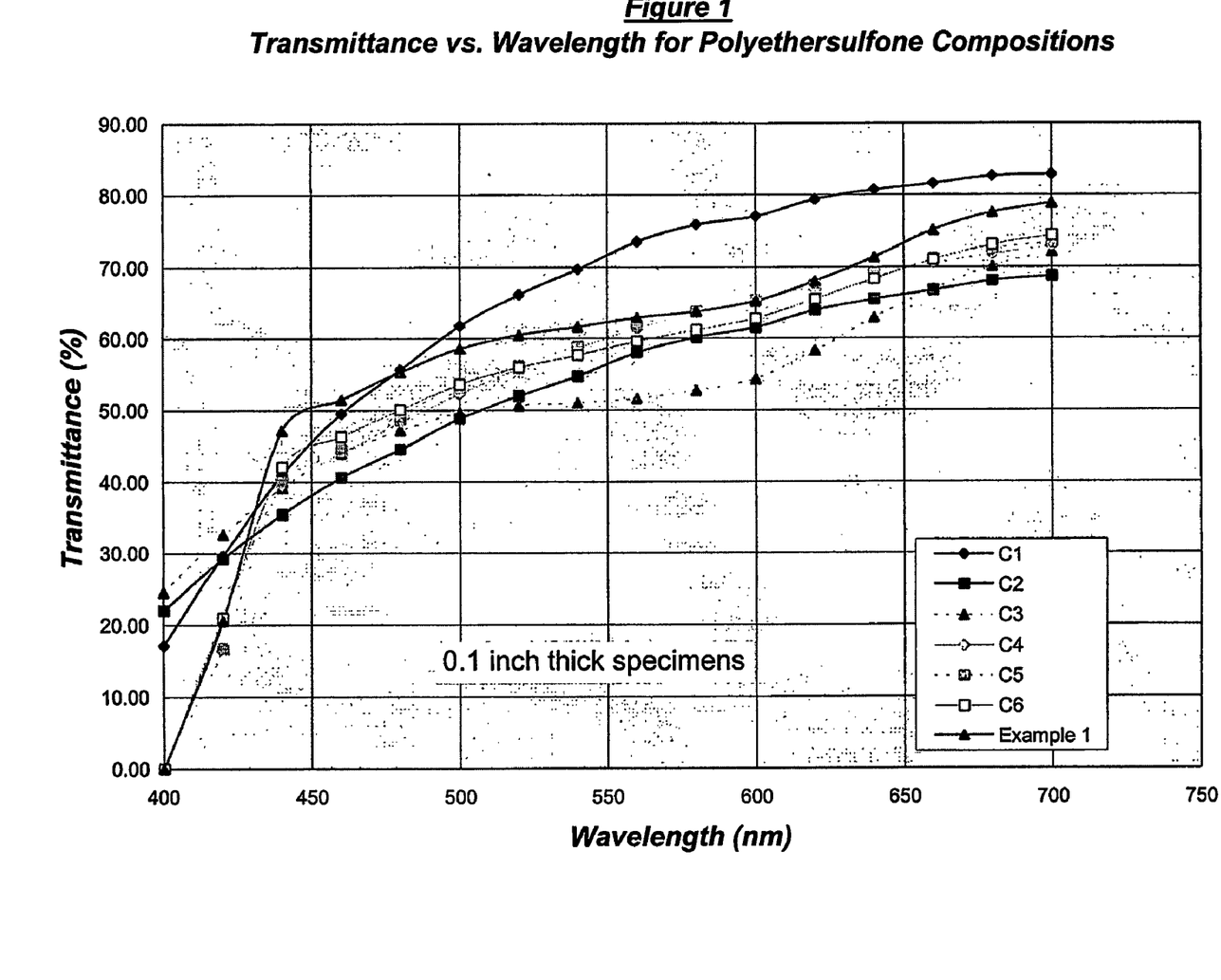
FIG. 1 graphically contrasts light transmittance versus wavelength of molded polyarylethersulfone compositions of the present invention and molded prior art polyarylethersulfone compositions.

The above 12 samples were injection molded into color plaques (2"×3"×0.10") and step plaques at 3 thicknesses (0.13", 0.10" and 0.70"). The step plaques were used for visual comparison between the different materials while the flat color plaques were used to generate optical properties. Optical properties measured included the following: % light transmittance, haze, color factor, yellowness index, X, Y, Z tristimulus coordinates. The optical properties were tested as described in Table 5. Results are presented in Tables 6 and 7. The transmittance of the molded sample plaques at a number of wavelengths spanning the visible spectrum is provided in Tables 8 and 9. The light transmittance versus wavelength is plotted for a number of Examples in FIG. 1. All the data in Tables 6-9 and FIG. 1 are based on 0.1 inch thick sample plaques.

TABLE 5

Test Methods

| Test | Method | Description/Conditions |
|---|---|---|
| Yellowness Index | ASTM D-1925 | Nominal sample thickness = 0.1 in. |
| Light Transmittance | ASTM D-1003 | Nominal sample thickness = 0.1 in. |
| Haze | ASTM D-1003 | Nominal sample thickness = 0.1 in; A spectrophotometer was used rather than a haze meter. |
| Color Factor | | Test method described in Background Of The Invention. |

TABLE 6

Optical properties of Controls/Comparative Examples C1-C6 and Example 1.

| Testing Information: | C1 | C2 | C3 | C4 | C5 | C6 | 1 |
|---|---|---|---|---|---|---|---|
| Light Transmittance "Y" (%) | 71.39 | 56.63 | 52.36 | 60.24 | 60.54 | 59.13 | 62.68 |
| X | 68.64 | 55.30 | 51.49 | 58.49 | 58.60 | 57.46 | 60.59 |
| Z | 54.69 | 45.94 | 49.70 | 48.72 | 48.55 | 50.95 | 56.25 |
| Color Factor | 201.4 | 220.0 | 130.1 | 193.7 | 199.7 | 172.6 | 147.2 |
| Yellowness Index | 38.76 | 41.63 | 25.04 | 38.31 | 38.66 | 32.83 | 28.38 |
| Haze (%) | 3.09 | 10.9 | 8.49 | 7.76 | 7.54 | 7.14 | 4.54 |

TABLE 7

Optical properties of controls/comparative examples C7-C9 and examples 2 and 3.

| Testing Information: | Examples | | | | |
|---|---|---|---|---|---|
| | C7 | C8 | 2 | 3 | C9 |
| Light Transmittance "Y" (%) | 54.12 | 50.72 | 55.07 | 50.34 | 71.88 |
| X | 52.70 | 49.06 | 53.05 | 48.29 | 69.12 |
| Z | 31.39 | 32.61 | 36.87 | 37.24 | 56.11 |
| Color Factor | 332.8 | 302.0 | 275.8 | 237.1 | 213.1 |
| Yellowness Index | 62.91 | 55.40 | 52.09 | 44.13 | 40.1 |
| Haze (%) | 6.76 | 6.18 | 5.21 | 5.43 | 3.17 |

TABLE 8

Transmittance at different wavelengths of visible light for controls/comparative examples C1-C6 and example 1.

| Wavelength (nm) | Examples | | | | | | |
|---|---|---|---|---|---|---|---|
| | C1 | C2 | C3 | C4 | C5 | C6 | 1 |
| 400 | 17.15 | 22.01 | 24.54 | 0.01 | 0.01 | 0.01 | 0.01 |
| 420 | 29.67 | 29.28 | 32.69 | 21.23 | 16.76 | 20.93 | 20.61 |
| 440 | 41.05 | 35.54 | 39.29 | 39.59 | 40.01 | 42.09 | 47.16 |
| 460 | 49.50 | 40.67 | 44.03 | 44.03 | 44.51 | 46.32 | 51.48 |
| 480 | 55.62 | 44.54 | 47.18 | 48.34 | 48.65 | 50.07 | 55.29 |
| 500 | 61.77 | 48.83 | 49.66 | 52.25 | 52.85 | 53.58 | 58.59 |
| 520 | 66.19 | 52.00 | 50.71 | 55.78 | 56.19 | 55.94 | 60.51 |
| 540 | 69.71 | 54.72 | 51.04 | 58.69 | 58.90 | 57.66 | 61.62 |
| 560 | 73.51 | 58.02 | 51.64 | 61.41 | 61.87 | 59.62 | 62.89 |
| 580 | 75.78 | 60.17 | 52.73 | 63.49 | 63.76 | 61.15 | 63.76 |
| 600 | 76.95 | 61.51 | 54.34 | 65.46 | 65.38 | 62.75 | 65.28 |
| 620 | 79.36 | 63.92 | 58.30 | 67.26 | 67.45 | 65.55 | 68.05 |
| 640 | 80.67 | 65.55 | 62.88 | 68.95 | 69.26 | 68.39 | 71.39 |
| 660 | 81.58 | 66.77 | 66.94 | 70.56 | 71.12 | 71.04 | 75.07 |
| 680 | 82.62 | 68.11 | 70.10 | 71.78 | 72.58 | 73.09 | 77.51 |
| 700 | 82.84 | 68.75 | 72.16 | 72.91 | 73.42 | 74.32 | 78.87 |

TABLE 9

Transmittance at different wavelengths of visible light for controls/comparative examples C7-C9 and examples 2 and 3.

| Wavelength (nm) | Examples | | | | |
|---|---|---|---|---|---|
| | C7 | C8 | 2 | 3 | C9 |
| 400 | 5.28 | 0.01 | 0.01 | 0.01 | 18.02 |
| 420 | 13.82 | 7.75 | 9.01 | 6.30 | 31.00 |
| 440 | 22.04 | 24.58 | 27.97 | 29.16 | 42.41 |
| 460 | 28.62 | 30.55 | 34.65 | 35.51 | 50.59 |
| 480 | 34.41 | 36.05 | 40.38 | 40.61 | 56.82 |
| 500 | 40.74 | 41.28 | 45.88 | 44.99 | 62.38 |
| 520 | 46.85 | 46.01 | 50.44 | 48.00 | 66.98 |
| 540 | 51.86 | 49.27 | 53.59 | 49.47 | 70.56 |
| 560 | 56.42 | 51.79 | 56.30 | 50.52 | 73.70 |
| 580 | 59.65 | 53.80 | 58.25 | 51.31 | 75.95 |
| 600 | 62.01 | 56.13 | 60.40 | 53.33 | 77.63 |
| 620 | 64.97 | 59.45 | 63.57 | 56.75 | 79.39 |
| 640 | 67.16 | 63.43 | 67.19 | 61.77 | 80.67 |
| 660 | 68.87 | 67.46 | 70.96 | 67.83 | 81.63 |
| 680 | 70.52 | 70.33 | 73.61 | 71.92 | 82.51 |
| 700 | 71.58 | 72.42 | 75.27 | 74.21 | 83.15 |

The data show that:

1. Molded polyethersulfone compositions according to the present invention have higher transmittance than extruded polyethersulfone (C2) and the polyethersulfone composition with only the dye additive (C3) over the range of visible wavelengths.

2. Molded polyethersulfone compositions with PEPQ™ melt stabilizer (e.g. Example 1) feature reduced yellowness indices in contrast to the virgin and extruded polyethersulfone (C1, C2), compositions with only the optical brightener additive (C4, C5), and compositions where both an optical brightener and a dye are included but not a phosphorous containing melt stabilizer (C6).

3. Molded polyethersulfone and polyphenylsulfone compositions according to the present invention all show acceptable haze levels below 10%.

4. Molded polyphenylsulfone compositions according to the present invention (e.g. Example 2) feature lower yellowness indices than extruded polyphenylsulfone (C7) while maintaining essentially the same light transmittance across the visible spectrum.

5. Molded polyphenylsulfone compositions according to the present invention (Examples 2 and 3) have reduced haze relative to extruded polyphenylsulfone (C7) and a composition where both an optical brightener and a dye are included but not a phosphorous containing melt stabilizer (C8).

The data from the examples presented illustrate that PAES compositions according to the present invention have the desired optical qualities necessary for forming molded articles for aesthetically demanding end uses.

The embodiments illustrated in the instant disclosure are for illustrative purposes. They should not be construed to limit the scope of the claims. As is clear to one of ordinary skill in this art, the instant disclosure encompasses a wide variety of embodiments not specifically illustrated herein.

What is claimed is:

1. A polyarylethersulfone polymer composition comprising:
   a polyphenylsulfone;
   an organic phosphorous-containing compound; and
   at least one additive selected from the group consisting of:
   a blue to violet dye; and
   an optical brightener,
   wherein said optical brightener is a bisbenzoxazole.

2. A polyarylethersulfone polymer composition comprising:
   a polyethersulfone or a polyphenylsulfone;
   from 30 ppm to 3000 ppm of an organic phosphorous-containing melt stabilizer; and
   from 0.1 ppm to 200 ppm of a blue to violet dye;
   wherein said polyethersulfone comprises the structural unit

3. The polyarylethersulfone polymer composition of claim 2, wherein the composition comprises:
   from 1 ppm to 20 ppm of the dye; and
   from 100 ppm to 1500 ppm of the melt stabilizer.

4. A polyarylethersulfone polymer composition comprising:
   a polyethersulfone or a polyphenylsulfone;
   an organic phosphorous-containing compound;
   a blue to violet dye; and
   an optical brightener.

5. The composition according to claim 4, wherein the composition comprises a polyethersulfone comprising the structural unit

6. The composition according to claim 1, wherein the polyphenylsulfone comprises the structural unit

7. The composition according to claim 4, wherein the composition comprises a polyphenylsulfone comprising the structural unit

8. The composition according to claim 1, wherein said composition exhibits a light transmittance of at least about 60% and a haze of less than about 5% when measured on a 0.1 inch thick specimen using ASTM method D-1003.

9. The composition according to claim 8, wherein said composition has 1) a yellowness index (YI) of less than about 30 as measured according to ASTM D-1925 on a 0.1 inch thick specimen, or 2) a color factor (CF) of less than about 150, wherein CF is defined by the equation:

$$CF=270[(x+y)_{sample}-(x+y)_{air}]/t$$

wherein x and y are chromaticity coordinates measured in transmittance mode and t is the sample thickness in inches.

10. The composition according to claim 6, wherein said composition exhibits a light transmittance of at least about 50% and a haze of less than 5.5% when measured on a 0.1 inch thick specimen using ASTM method D-1003.

11. The composition according to claim 10, wherein said composition exhibits 1) a yellowness index (YI) of less than 54 as measured according to ASTM D-1925 on a 0.1 inch thick specimen, or 2) a color factor (CF) of less than 280, wherein CF is defined by the equation:

$$CF=270[(x+y)_{sample}-(x+y)_{air}]/t$$

wherein x and y are chromaticity coordinates measured in transmittance mode and t is the sample thickness in inches.

12. The composition according to claim 1, wherein the organic phosphorous-containing compound is an organic phosphonite, optionally in mixture with an organic phosphite.

13. The composition according to claim 5, wherein the organic phosphorous-containing compound is an organic phosphonite, optionally in mixture with an organic phosphite.

14. The composition according to claim 7, wherein the organic phosphorous-containing compound is an organic phosphonite, optionally in mixture with an organic phosphite.

15. The composition according to claim 5, wherein said optical brightener is a bisbenzoxazole.

16. The composition according to claim 7, wherein said optical brightener is a bisbenzoxazole.

17. A melt fabricated article comprising the polyarylethersulfone composition according to claim 1.

18. An injection molded or compression molded article comprising the polyarylethersulfone composition according to claim 1.

19. A hybrid injection-compression molded article comprising the polyarylethersulfone composition according to claim 1.

20. An extruded article comprising the polyarylethersulfone composition according to claim 1.

21. A blow-molded article comprising the polyarylethersulfone composition according to claim 1.

22. A thermoformed article comprising the polyarylethersulfone composition according to claim 1.

23. A polyarylethersulfone polymer composition comprising:
- a polyethersulfone or a polyphenylsulfone;
- from 30 ppm to 3000 ppm of an organic phosphorous-containing melt stabilizer; and
- from 1 ppm to 10,000 ppm of a bisbenzoxazole optical brightener.

* * * * *

UNITED STATES PATENT AND TRADEMARK OFFICE
CERTIFICATE OF CORRECTION

| | | |
|---|---|---|
| PATENT NO. | : 7,456,248 B2 | Page 1 of 1 |
| APPLICATION NO. | : 10/510707 | |
| DATED | : November 25, 2008 | |
| INVENTOR(S) | : El-Hibri | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this
First Day of November, 2011

David J. Kappos
*Director of the United States Patent and Trademark Office*